United States Patent [19]
Smith

[11] 3,893,677
[45] July 8, 1975

[54] QUICK CHANGE SPINDLE ADAPTER FOR TOOL HOLDER

[75] Inventor: Theodore M. Smith, Detroit, Mich.

[73] Assignees: Lucille G. Smith, trustee; Theodore M. Smith, trustee, both of Mt. Clemens, Mich.

[22] Filed: Dec. 26, 1973

[21] Appl. No.: 428,243

[52] U.S. Cl. ................................ 279/75; 279/82
[51] Int. Cl. ........................................ B23b 31/22
[58] Field of Search............ 279/82, 75, 30, 22, 1 B

[56] References Cited
UNITED STATES PATENTS

| | | | |
|---|---|---|---|
| 2,751,229 | 6/1956 | Schultz | 279/30 X |
| 2,970,844 | 2/1961 | Better | 279/75 |
| 3,672,692 | 6/1972 | Fauth | 279/82 |
| 3,767,218 | 10/1973 | Linthicum et al. | 279/82 |

Primary Examiner—Gil Weidenfeld
Attorney, Agent, or Firm—Cullen, Settle, Sloman & Cantor

[57] ABSTRACT

A quick change adapter for a power rotated spindle to removably receive a tool holder which includes a cylindrical body mounted on and projecting forwardly of the spindle. A forwardly retractable spring biased control sleeve with a tapered inner wall is movably mounted on said body. A tool holder is removably projected into said body and spindle. A collar on said tool holder is nested in said body and bears against said spindle. A series of spaced balls are nested in said body with portions of the balls extending radially outward operatively engaged by said sleeve tapered inner wall with inner portions of said balls retainingly engaging said collar. Retraction of said sleeve permits removal of said tool holder.

6 Claims, 2 Drawing Figures

QUICK CHANGE SPINDLE ADAPTER FOR TOOL HOLDER

BACKGROUND OF THE INVENTION

The present invention is an improvement in the quick change spindle adapter of my co-pending United States patent applications, Ser. No. 163,946, filed July 19, 1971, now U.S. Pat. No. 3,720,417 dated Mar. 13, 1973, and Ser. No. 246,269 filed Apr. 21, 1972 now U.S. Pat. No. 3,851,890 dated Dec. 3, 1974. One of the difficulties sought to be overcome in the present invention is preventing accidental disengagement of the tool holder from its spindle. Under some conditions, transverse eccentric forces applied to the tool holder cause transverse radial tilting movements of the holder with respect to the securing balls. Under some conditions there is the chance that the tool holder will be accidentally dislodged from said balls.

In my co-pending application, Ser. No. 225,872 filed Feb. 14, 1972 now U.S. Pat. No. 3,756,737 dated Sept. 4, 1973, a two-piece nut assembly was employed.

BRIEF DESCRIPTION

In the co-pending applications, a nut assembly threadedly receives the tool holder with means provided to anchor the nut assembly. It is an object of the present invention to eliminate the nut assembly and employ a direct anchoring of the tool holder within the power-rotated spindle.

It is another object to provide an improved tool holder assembly designed to prevent accidental dislodgement from the spindle. For this purpose the bore of said body is uniform. A collar on the tool holder seats directly on the forward end of the spindle. Any outward thrust upon the tool holder is counteracted by increased retaining forces acting through the elongated binding angle of the retractable sleeve, retaining balls and the tool holder resulting in increased holding pressure upon the tool holder for anchoring the same against outward displacement.

It is a further object to provide an improved tool holder and which has upon its exterior a preformed holding collar which is retainingly engaged by the balls carried by the body and pressed inwardly by the retractable sleeve. This accomplishes the main objective of securing the tool holder within the spindle and preventing accidental forward displacement thereof from the spindle body sleeve combination.

These and other objects will be seen from the following specification and claims in conjunction with the appended drawing.

THE DRAWING

Figures 1, 2:
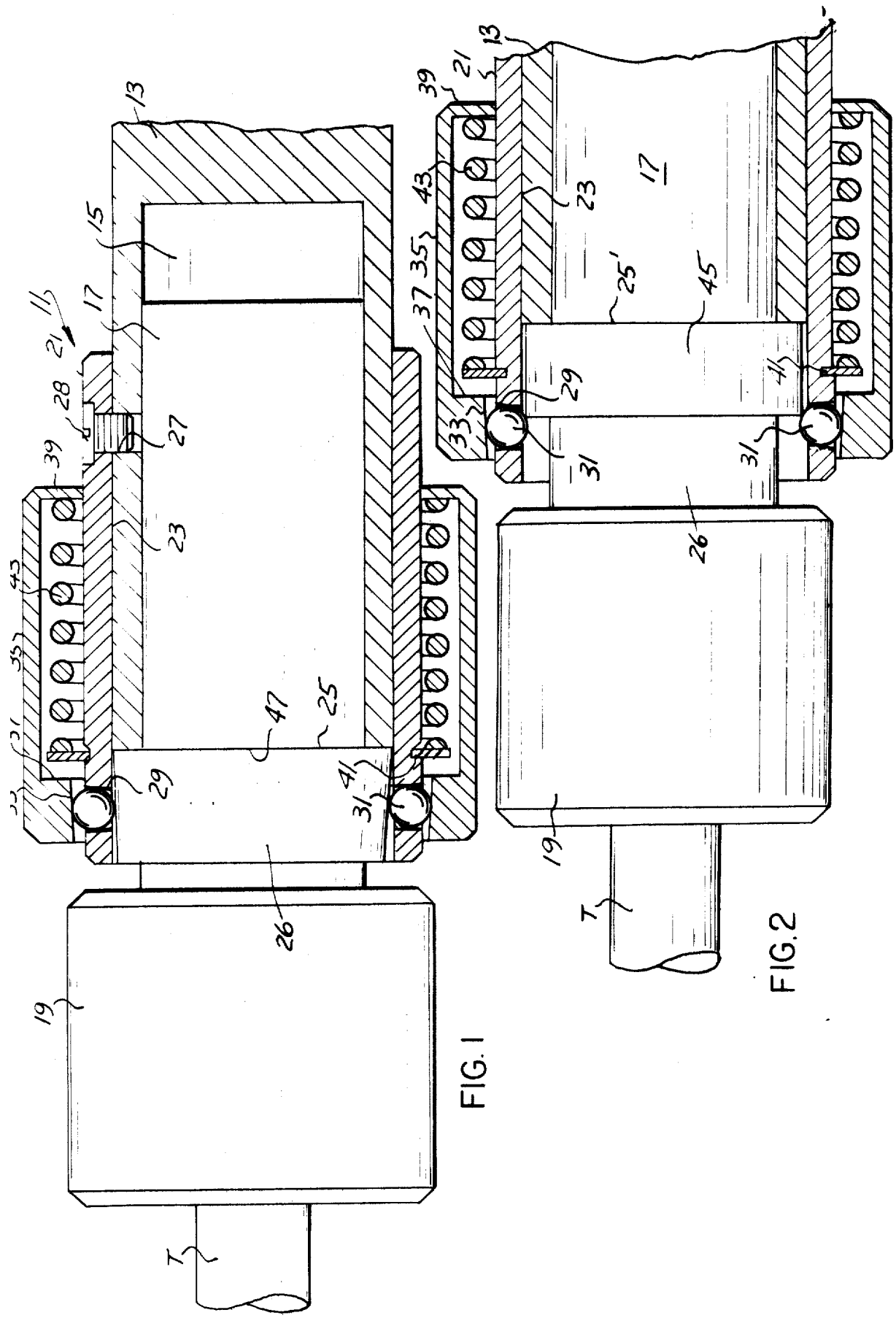
FIG. 1 is a longitudinal section of the present spindle and quick change spindle adapter with improved tool holder.
FIG. 2 is a similar view of a modification.

It will be understood that the above drawing merely illustrates a preferred embodiment of the invention, and that other embodiments are contemplated within the scope of the claims hereafter set forth.

DETAILED DESCRIPTION

Referring to the drawing, FIG. 1, the quick change spindle adapter 11 includes the power rotated spindle 13, fragmentarily shown and broken away for illustration. It has an internal bore 15 adapted to receive the shank 17 of tool holder 19. The latter has a tapered or other bore to removably receive tool T which may be a bore, a counterbore, a drill, a tap or other cutting tool.

Elongated cylindrical body 21 is mounted on and around the spindle, has a uniform bore 23 and projects forwardly of said spindle to cooperatively receive the collar 25 upon the shank of said tool holder. Cap screw 28 extends through body 21 and threadedly extends into radial bore 27 in said spindle. This anchors the body to the spindle.

Said body at its forward end has a series of spaced radial apertures 29 within which are movably positioned a corresponding series of balls 31. These balls cooperate with the rearwardly and outwardly tapered inner wall 33 of sleeve 35, and are adapted to retainingly engage the tool holder collar 25. Sleeve 35 includes a pair of interior longitudinally spaced shoulders 37 and 39. Split ring 41 is mounted upon body 21 within a corresponding annular slot therein and is adapted to retainingly engage shoulder 37.

Coiled compression spring 43 surrounds said body, at one end engages ring 41 and at its opposite end retainingly engages the internal flange 39 of said sleeve to bias the sleeve to the normal retaining position shown in FIG. 1. The sleeve is adapted for manual forward movement relative to said body for disengaging the tool holder.

TOOL HOLDER ASSEMBLY

The tool holder 19 includes an elongated collar 25 upon its shank 17. Said collar is retained on the shank or may be a part thereof. Said collar has an external annular rearwardly and outwardly tapered face 26 adapted for cooperative retainingly registry with balls 31. In FIG. 1 it is of coneform with its face converging forwardly realtive to the sleeve tapered inner wall portion 33. The outer surface of the collar may be cylindrical as at 45 on collar 25', FIG. 2.

In either case, the outer surface of the collar is converging relative to the tapered inner wall 33 of said sleeve. The interior rearwardly tapered wall 33 of sleeve 35 provides a binding angle with respect to collar 25 and balls 31 therebetween. With the arrangement shown in FIG. 1, the internal tapered wall 33 of said sleeve is in cooperative wedging and engaging registry with balls 31 which in turn retainingly register with collar 25 or 25' on the tool holder. Collar 25 or 25' at its inner end seats as at 47 upon the outer end of spindle 13 and is nested within body 21.

As shown in FIGS. 1 and 2, any outward thrust upon the tool or tool holder 19 causes the balls 31 to rotate. Said balls frictionally engaging the outer sleeve, tend to force the same axially inward. This tends to increase its retaining force on the balls to more tightly anchor the tool holder against such displacement.

Any forward force on collar 25 causes the balls to roll inwardly for further anchoring of the tool holder. Since the surface 33 and the outer surface of the collar converge forwardly there is provided an increased wedging and holding force for anchoring and securing the tool holder against accidental displacement from body 21.

MODIFICATION

Referring to FIG. 2, the assembly shown therein is substantially the same except that the collar 25' is cylindrical in form and has an outer annular surface 45.

With this collar substituted for collar 25 of FIG. 1, the spaced balls 31 are interposed between the cylindrical surface 45 and the binding angle or rearwardly outwardly tapered inclined surface 33 of retractible sleeve 35.

Such cylindrical surface 45 is employed when the additional clamping forces of the outwardly and rearwardly tapered collar 25–26 in FIG. 1 is not required. FIG. 1 and FIG. 2 are the same in principle as no close longitudinal relationship between the balls 31 and collar 25 in FIG. 1 and collar 25' in FIG. 2 is required. FIG. 2 only shows the extreme longitudinal relationship that can be obtained and remain functional.

The same function occurs. Any tendency of the tool holder to move outward towards an accidental disengagement from the holding body is restricted and restrained by virtue of the angular relationship between surfaces 33 and 45 when collar 25' of FIG. 2 is substituted in FIG. 1.

MODIFICATION

FIG. 2 illustrates a modified construction wherein the balls 31 are in advance of the collar and retainingly engage its forward annular corner with a wedging action. This also anchors the tool holder in FIG. 2. Collar 25' is shown as cylindrical.

Having described my invention, reference should now be had to the following claims.

I claim:

1. A quick change adapter for a power rotated spindle having a bore adapted to receive a tool holder;
    a cylindrical body having a uniform axial bore mounted upon and secured to said spindle and projecting forwardly thereof;
    a forwardly retractable spring biased sleeve movably mounted on said body and including a rearwardly and outwardly tapered inner wall;
    a tool holder mounting a tool projected into said body with a shank snugly nested in the spindle bore;
    and a collar of circular crossection on said tool holder intermediate its ends projected into said body and bearing against the end of said spindle;
    there being a series of spaced balls movably nested in said body in a single transverse plane; portions of said balls projected radially inward retainingly engaging said collar and projected radially outward for cooperative engagement with said tapered inner wall;
    the tapered inner wall of the sleeve converging relative to the collar surface providing a cooperating wedging action of the balls between the collar and the sleeve inner wall for anchoring said tool holder within said body and against the end of said spindle, whereby forward manual retraction of said sleeve releases said balls facilitating assembly to and manual removal of said tool holder from said body and spindle.

2. In the adapter of claim 1, the outer surface of said collar being tapered outwardly and rearwardly.

3. In the adapter of claim 1, the outer surface of said collar being cylindrical.

4. The combination with a power driven spindle having a bore, a cylindrical body of uniform bore throughout its length secured thereon and projecting forwardly thereof, a retractable spring biased sleeve having a tapered inner wall mounted on the body and laterally movable balls on said body in a single transverse plane operably engaged by said sleeve; of a tool holder projected into said body having a shank snugly nested in said spindle bore;
    a collar of circular crossection on said tool holder projected into said body and bearing against the end of said spindle;
    portions of said balls being projected radially inward retainingly engaging said collar, whereby forward manual retraction of said sleeve releases said balls facilitating assembly and manual removal of said tool holder;
    said collar including a body surrounding said tool holder, the exterior surface of said collar being tapered rearwardly and outwardly for cooperating retaining registry with said balls;
    the tapered inner wall of the sleeve converging relative to the collar surface providing a cooperating wedging action of the balls between the collar and the sleeve inner wall for anchoring said tool holder within said body and against the end of said spindle.

5. In the adapter of claim 1, said balls being interposed between the sleeve inner wall and the outer surface of said collar.

6. In the adapter of claim 1, said balls being interposed between the sleeve inner wall and the forward corner of said collar.

* * * * *